O. J. KENNEDY.
SPRINKLING SYSTEM.
APPLICATION FILED JUNE 26, 1908.
917,614.
Patented Apr. 6, 1909.
2 SHEETS—SHEET 1.
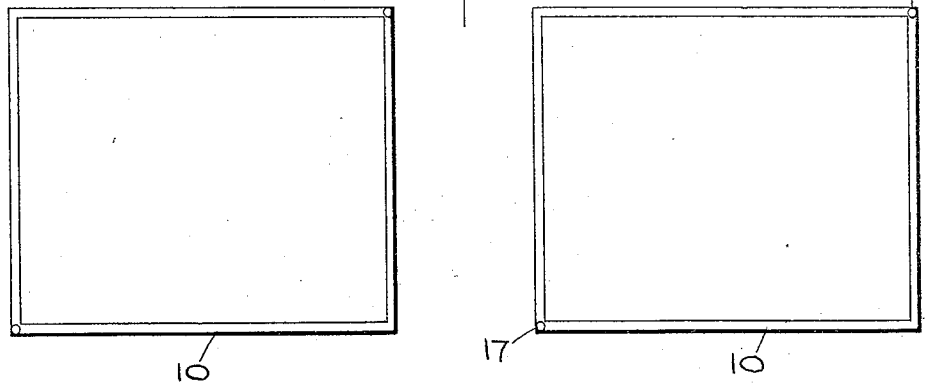
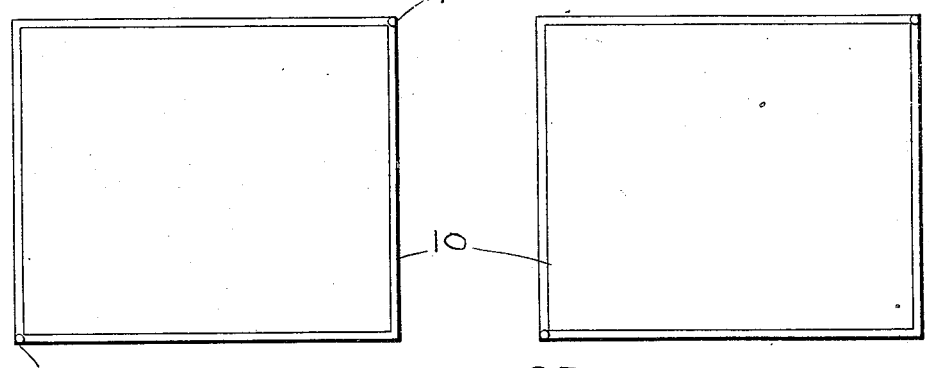
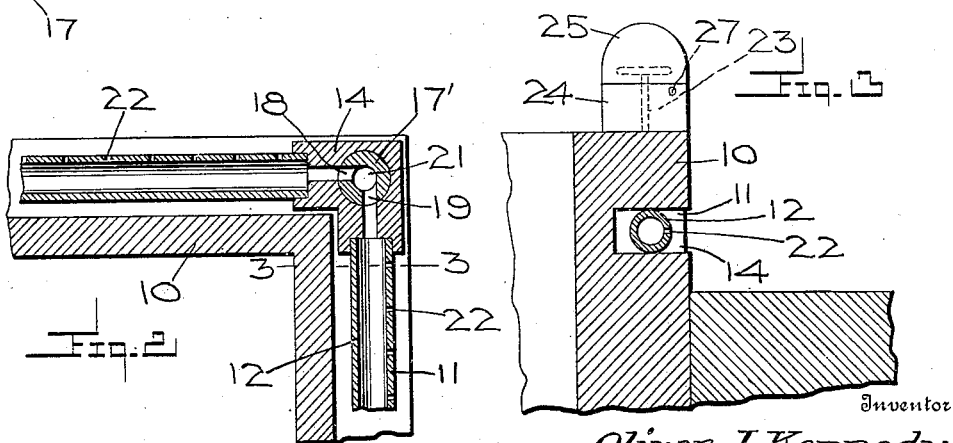
Witnesses
Ed. R. Lusky.
E. L. Chandlee
Inventor
Oliver J. Kennedy
By Woodward & Chandlee
Attorney O. J. KENNEDY.
SPRINKLING SYSTEM.
APPLICATION FILED JUNE 26, 1908.
917,614.
Patented Apr. 6, 1909.
2 SHEETS—SHEET 2.
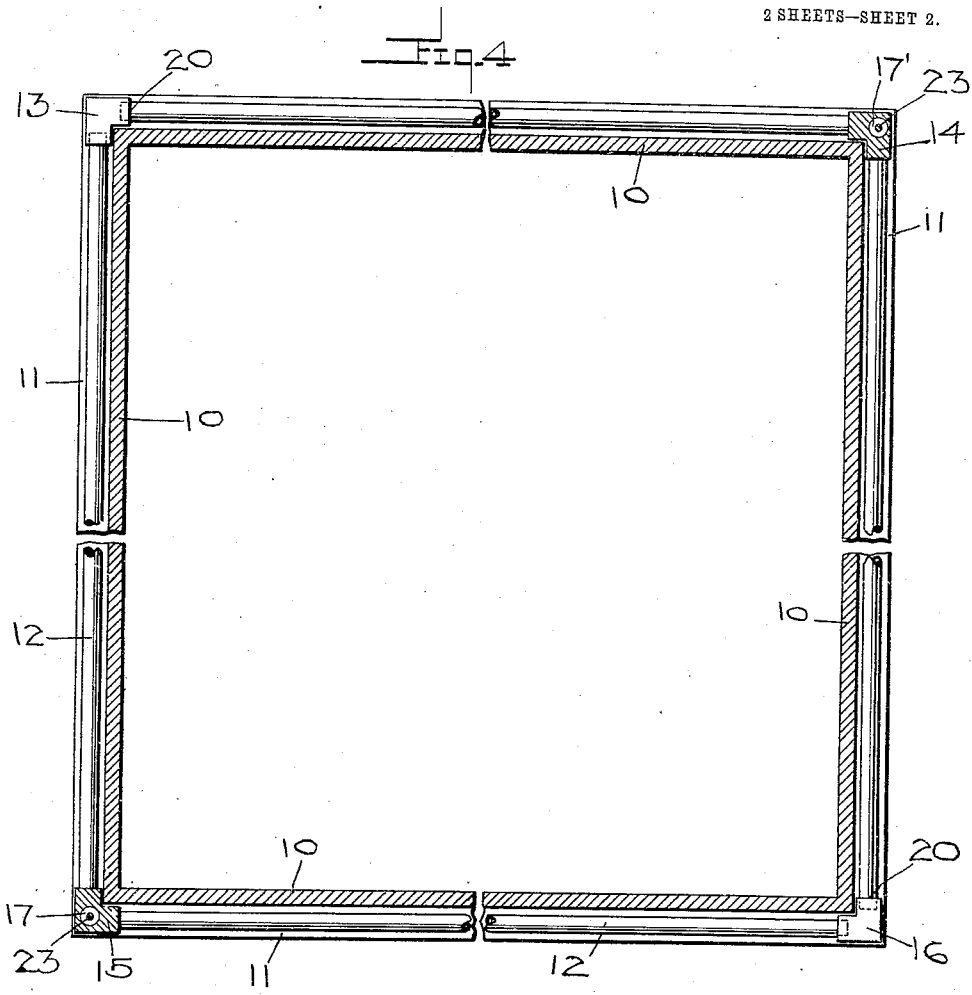
Witnesses
Ed. R. Lusby
E. L. Chandle
Inventor
Oliver J. Kennedy
By Woodward & Chandler
Attorney

UNITED STATES PATENT OFFICE.

OLIVER JEFFERSON KENNEDY, OF SAN DIEGO, CALIFORNIA, ASSIGNOR OF ONE-HALF TO PATRICK W. SWEENEY, OF SAN DIEGO, CALIFORNIA.

SPRINKLING SYSTEM.

No. 917,614.  Specification of Letters Patent.  Patented April 6, 1909.

Application filed June 26, 1908. Serial No. 440,555.

*To all whom it may concern:*

Be it known that I, OLIVER J. KENNEDY, a citizen of the United States, residing at San Diego, in the county of San Diego and State of California, have invented certain new and useful Improvements in Sprinkling Systems, of which the following is a specification.

This invention relates to improvements in water distribution, and more particularly to an apparatus for sprinkling streets, and has for its object to provide a system of this character whereby streets or the like may be conveniently and easily flushed.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a diagrammatic view of the present system, Fig. 2 is a detail longitudinal sectional view through one of the valves, Fig. 3 is a vertical cross sectional view on the line 3—3 of Fig. 2. Fig. 4 is a horizontal sectional view showing the application of my invention around the curbing of a street or block to be flushed.

In describing my invention, for illustration, it will be stated that my sprinkling main is arranged around a city block as shown in the diagram in Fig. 1, and this piping is arranged within the curbing to be protected thereby and in the arrangement of the system it will be seen that the sprinkling mains of two adjacent blocks are arranged in a manner to flush one-half of the facing street. Figs. 3, and 4 of the drawings show a curbing 10 which is arranged in the ordinary manner at each side of a street or roadway. The curbing 10 is provided in its front face with a horizontally extending groove 11, and these grooves are formed in each of the respective pieces of curbing. The groove 11 of one section is shown as communicating with a similar groove of the next section, to form a protecting pocket for the sprinkling mains. These mains are situated a suitable distance above the surface of the street.

Longitudinally extending pipes 12 are arranged in the grooves 11 which are formed in the curbing, and these pipes are connected at their ends by the blind coupling heads 13, and 16, and the valves 14 and 15 which latter are each provided with an upstanding turning stem and these valves are provided with the ports 18 and 19 arranged to communicate with two of the pipe sections 12. The ends of the pipe sections 12 opposite the valves enter the closed end 20 of the blind couplings 13 and 16. The valves 17 and 17' are each in communication with a water main or other suitable water source by way of a passage 21. Each of the sprinkling mains is provided with a longitudinally extending line of jet perforations 22 for the outlet of water from the main.

When it is desired to flush a street, the valves 17 and 17' are turned to bring their ports into registration with the open ends of the sprinkling mains 12, and the water from the mains will be conveyed to the respective pipe sections for distribution to the streets through the jet perforations in the pipes. It will of course be understood that the stems 23 of the valves 17 and 17' are located above the curbing, and these stems may be protected by a housing 24 which I preferably provide with a hinged upper hood 25. The hood 25 is also provided with a suitable lock 27 by means of which the hood is secured.

The pocket forming grooves, it will be noticed, face laterally outward, and in reference to Fig. 1, it will be seen that the sprinkling mains extend at right angles from one another, the valves being positioned at diametrically opposite corners. While the sprinkling mains snugly fit into said pocket, they may be readily removed, in case of necessity.

And having thus described my said invention, what I claim as new, and desire to secure by United States Letters Patent, is:—

A street sprinkling apparatus, comprising four sprinkling mains disposed so that two mains on opposite sides of the block are parallel to each other, each main having a line of jet holes, a valve positioned at two diametrically opposite corners, each valve communicating with two mains, two blind couplings at the remaining two corners, a curb to receive said sprinkling mains, having a horizontally disposed groove forming a pocket situated a suitable distance above the surface of the street, said pocket facing laterally outward, said sprinkling mains being of a diameter to snugly fit into said groove, and an upstanding valve stem projecting from each of said valves, each valve being connected to a suitable source of supply, all arranged as set forth.

In testimony whereof I affix my signature, in presence of two witnesses.

OLIVER JEFFERSON KENNEDY.

Witnesses:
A. W. AMES,
L. C. DANA.